(No Model.)

G. H. POTTER.
DEVICE FOR TRANSMITTING POWER.

No. 355,206. Patented Dec. 28, 1886.

Witnesses,
J. H. Shumway
Fred C. Earle

Geo. H. Potter,
Inventor
By Atty,
John C. Earle

UNITED STATES PATENT OFFICE.

GEORGE H. POTTER, OF WATERBURY, CONNECTICUT, ASSIGNOR TO THE BENEDICT & BURNHAM MANUFACTURING COMPANY, OF SAME PLACE.

DEVICE FOR TRANSMITTING POWER.

SPECIFICATION forming part of Letters Patent No. 355,206, dated December 28, 1886.

Application filed October 4, 1886. Serial No. 215,240. (No model.)

*To all whom it may concern:*

Be it known that I, GEORGE H. POTTER, of Waterbury, in the county of New Haven and State of Connecticut, have invented a new Improvement in Devices for Transmitting Power; and I do hereby declare the following, when taken in connection with accompanying drawings, and the letters of reference marked thereon, to be a full, clear, and exact description of the same, and which said drawings constitute part of this specification, and represent, in—

Figure 1:
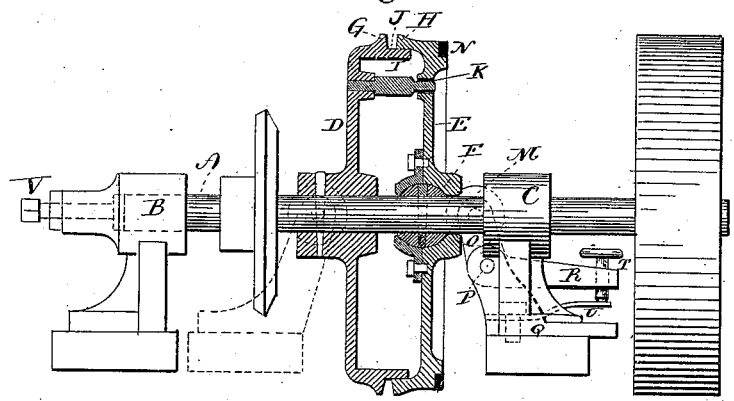
Figure 2:
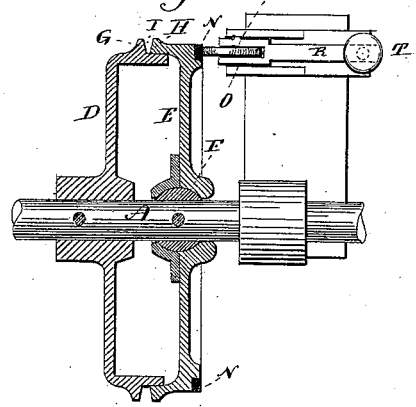
Figure 3:
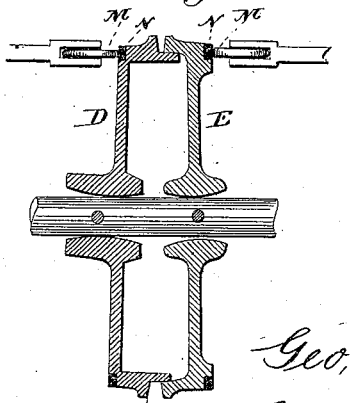

Figure 1, a longitudinal central section through the disks, looking toward the stationary bearing; Fig. 2, a horizontal section looking down upon the stationary bearing. Fig. 3 represents a modification in the arrangement of the disks and shaft.

This invention relates to an improvement in devices for transmitting power, and is an improvement upon the invention for which Letters Patent No. 305,931 were granted to the assignees in this application, September 30, 1884, the invention in that patent consisting in a pair of concentric revolving disks arranged upon axes slightly inclined to each other, and so that the adjacent faces of the disks in revolving gradually approach each other from one point toward the diametrically-opposite point, with a concentric cylindrical bearing-surface between said disks, upon which a rope or whatever it were to be gripped would run, and so that the adjacent faces on said disks outside said cylindrical surface, because of the inclination of their axes, operated to gradually grip the thing passing over said cylindrical surface, to cause the said thing to partake of the advance of the rotation of the disks or impart its rotation to the disk. In that patent the two disks were arranged upon independent shafts, so as to support the disks with their axes at an angle to each other, and so that the adjacent faces of the disk would approach each other toward a certain point and then recede therefrom, the said certain point being the extreme point of the grip. In employing the said device for transmitting power a band—as, for instance, a rope running between the said disks—would be gripped by the said disks at the said certain point, and the disks always maintained a grip upon the rope at that point; hence, if the rope or band around the disks be driven, it will positively communicate the driving force to the disks, because of the grip which the disks took upon the rope; or if the disks themselves were driven they would, because of so gripping the rope, impart their rotative movement to the rope, but the entire force of the grip is necessarily in the direction of the axes of the disks; hence the tendency of this force to separate the disks must be resisted by the bearings which support their respective shafts, and thus necessarily produce a great wearing friction.

The object of my invention is to avoid this thrusting strain upon the bearings of the shafts, as well as to attain the inclined axial line of the disks relatively to each other upon a single shaft or without changing the axial line of the shafts.

In the illustration, A represents a shaft upon which the device is arranged, and is represented as supported in bearings B C.

D represents one of the disks, which is rigidly fixed to the shaft. E represents the other disk, which is loosely fitted to the shaft, as here represented upon a ball-joint F, the hub of the disk E being constructed with a correspondingly-shaped socket, so that the disk E may oscillate on the shaft and be permitted to revolve in a plane the axis of which is at an angle to the axis of the shaft A, upon which it is arranged.

The two disks are each constructed with a flange at their periphery, turned toward each other so as to present, respectively, the working surfaces G and H adjacent to each other. One of the disks—say D—is constructed with a flange, I, which will extend within the flange of the other disk, and so that this flange will present a surface, J, between the two faces G H concentric with the axis of the shaft, and substantially as in the patent before referred to. The two disks are connected, so that the revolution of the shaft imparted to one disk will be communicated to the other. As here represented, this connection is made by a stud, K, fixed in the disk D, and extending through an opening, L, in the other disk, and there may be several such studs, if desired.

To hold the loose disk in the inclined position before referred to, and as seen in Fig. 2, I arrange a bearing against the back of the disk, substantially at the point of the nearest approach of the two faces G H, and so as to support the disk against force in an axial direction, and this bearing I preferably make in the form of an anti-friction wheel, M, to work against a flat surface on the back of the disk E; and that the disk may resist the wear consequent upon such revolving against the wheel M, I place in the back of the disk a hard-metal track, N, which forms the path on which the wheel M will run.

The two disks revolving, the wheel or bearing M will hold the disk E inclined to the disk D, as seen in Fig. 2—that is, so that the axis of revolution of the two disks are slightly inclined to each other, and so that the adjacent faces of the disks in revolving will gradually approach each other from a point diametrically opposite the bearing M, to the point where the said bearing is applied.

The bearing upon the disk (as the wheel M) may be stationary with relation to the disk; but I prefer to make it adjustable, and to do so I hang the wheel M in one arm, O, of a lever, hung upon a fulcrum, P, on a base, Q. The other arm, R, of the lever is provided with a set-screw, T, by which the wheel M may be adjusted to bring that point of the disk E nearer to or farther from the other disk, D.

As there may be irregularities in the rope or band which is running upon the disk, and which would necessarily make the grip of the disk upon the band or rope greater or less according to the irregularities, I provide a spring, U, upon which the bearing or wheel M is supported, the strength of which is equal to the greatest resistance required to be applied to the disk E, in order to properly grip the band or rope working between the two disks, but so as to yield should the force of the disk upon the wheel or bearing become greater than that so required. Under this arrangement the thrust of the disk E upon the shaft, as in the before-mentioned patent, is avoided, and whatever thrust is exerted by the disks is communicated in one direction, and this may be resisted, say by a screw, V, applied at one end of the shaft.

To avoid the thrust upon the shaft through the fixed disk D, a like bearing or anti-friction wheel may be applied to the disk D, as represented in Fig. 1; but in practice I find the fixed resistance applied to one disk only to be sufficient.

While I prefer to employ the ball-joint upon the shaft to work in a corresponding socket in the disk E it is only necessary that the disk shall be loose upon the shaft, so as to permit such an extent of lateral play as to produce the gradual grip upon the band. The ball-joint, therefore, may be omitted, as seen in Fig. 3.

Under some circumstances the two disks may be arranged loosely upon the shaft, so as to permit the oscillation of both, as I have described for the single disk E, as seen in Fig. 3, in which case the fixed bearing is applied to each disk, as seen in said Fig. 3.

The concentric bearing-surface between the working-faces of the two disks may be formed upon one of the disks, as I have described, or it may be an independent surface between the two disks, as described in the before-mentioned patent. In case the two disks are arranged loose upon the shaft, so that the axis of both will be oblique to the axis of the shaft this concentric bearing-surface is best made fixed directly to the shaft, as indicated in Fig. 3. In any case the disks should be connected.

By this improvement I attain upon a single continuous shaft the oblique direction of the axes of the two disks with relation to each other, described and required in the patent before referred to, but avoid the strain upon the bearings of the shaft.

I claim—

1. The combination of a pair of concentric revolving disks upon a single shaft, one of said disks fixed to the shaft so that the revolution of one is communicated to the other, the second disk arranged upon the same shaft, but loose at its axis, and so as to work in a plane the axis of which is oblique to the axis of the shaft upon which it is arranged, and a stationary bearing arranged to bear upon the said second disk at substantially the point in its circumference where the said second disk most nearly approaches the first disk, and a concentric bearing-surface between said disks, substantially as described.

2. The combination of a pair of concentric revolving disks arranged upon a single shaft, one of said disks fixed to the shaft, the second disk supported upon a ball-joint upon the shaft and so as to work in a plane the axis of which is oblique to the axis of the shaft upon which it is arranged, a stationary bearing arranged to bear upon said second disk at substantially the point in its circumference where the said second disk most nearly approaches the first disk, and a concentric bearing-surface between said disks, substantially as described.

3. The combination of the disk D, fixed to the shaft, the disk E, loose upon the shaft, concentric with the disk D, and constructed to present a working-face between the two, the said second disk loose upon the shaft, and so as to work upon an axis oblique to the shaft upon which it is arranged, and so as to present a working-surface oblique to the working-surface of the first disk, a concentric bearing-surface between said disks, and a stationary bearing against which said second disk revolves, said bearing being at the point where the working-face of the said second disk most nearly approaches the working-face of the first disk, said bearing made adjustable with relation to said second disk, substantially as described.

GEO. H. POTTER.

Witnesses:
E. L. FRISBIE, Jr.,
E. L. BRONSON.